United States Patent [19]

Hager, Jr.

[11] 4,419,023

[45] Dec. 6, 1983

[54] FAST-RESPONSE THERMOCOUPLE PROBE

[75] Inventor: Nathaniel E. Hager, Jr., Lancaster, Pa.

[73] Assignee: Armstrong World Industries, Inc., Lancaster, Pa.

[21] Appl. No.: 291,179

[22] Filed: Aug. 10, 1981

[51] Int. Cl.³ .......................... G01K 1/14; G01K 7/04
[52] U.S. Cl. ..................................... 374/179; 29/739;
136/225; 136/233; 374/153; 374/208
[58] Field of Search ............... 374/179, 153, 132, 230,
374/31, 44, 129; 136/230, 225

[56] References Cited

U.S. PATENT DOCUMENTS

| | | | |
|---|---|---|---|
| 2,025,015 | 12/1935 | Byrns | 374/179 X |
| 2,207,647 | 7/1940 | Whipple | 374/153 |
| 3,045,473 | 7/1962 | Hager, Jr. | 374/44 |
| 3,217,537 | 11/1965 | Hager, Jr. | 374/31 |
| 3,279,956 | 10/1966 | Ekstrom, Jr. | 374/153 X |
| 3,321,974 | 5/1967 | Sterbutzel | 374/134 |
| 3,332,285 | 7/1967 | Cook | 374/134 |
| 3,354,720 | 11/1967 | Hager, Jr. | 374/132 |
| 3,360,404 | 12/1967 | Beckman | 136/230 |
| 3,427,209 | 2/1969 | Hager, Jr. | 136/225 |
| 3,483,045 | 12/1969 | Villers | 136/225 |
| 3,529,473 | 9/1970 | Hager, Jr. | 374/129 |
| 3,690,176 | 9/1972 | Connolly et al. | 374/153 |
| 4,046,009 | 9/1977 | Sauer | 374/153 X |

Primary Examiner—Daniel M. Yasich

[57] ABSTRACT

Disclosed is a passive, fast-response thermocouple probe for accurately measuring temperatures of fixed or moving areas of surfaces, particularly of lightweight, low-thermal-conductivity materials, with only a minimal modification of their temperatures being caused by the probe's contact therewith. In making the probe, an approximation of the areal heat capacity of the object, the surface temperature of which is to be obtained, is determined. This information is then utilized to determine the required thickness, density, specific heat, and thermal conductivity of the layer of insulating material which is mounted on the mounting block of the probe. A thin, low-areal-heat capacity thermocouple is positioned on the upper surface of the insulating layer, and a thin, low-areal-heat capacity cover film is mounted over the foregoing elements and extends partially down the sides of the mounting block. Electrical lead wires attached to the leads on the thermocouple are then connected to a readout device including a reference junction.

11 Claims, 5 Drawing Figures

U.S. Patent  Dec. 6, 1983  4,419,023
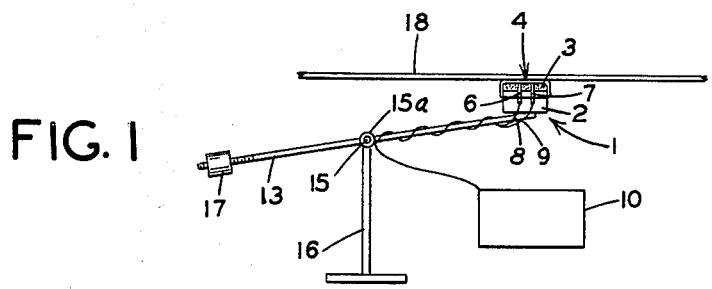
FIG. 1
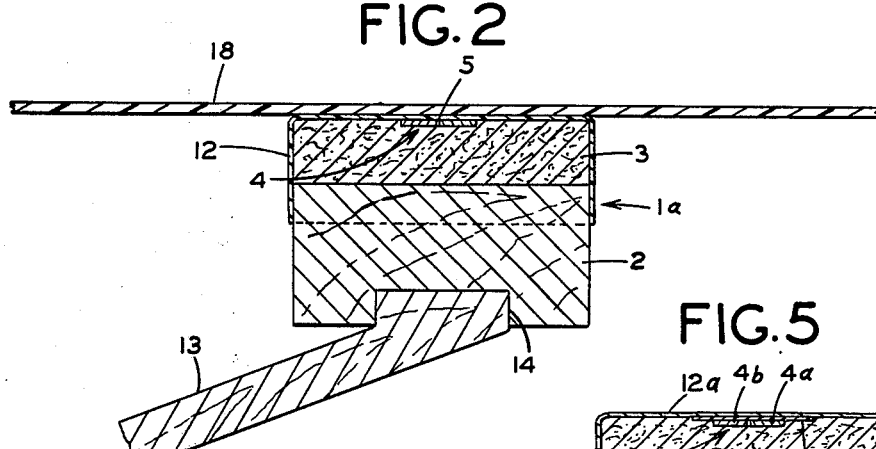
FIG. 2
FIG. 5
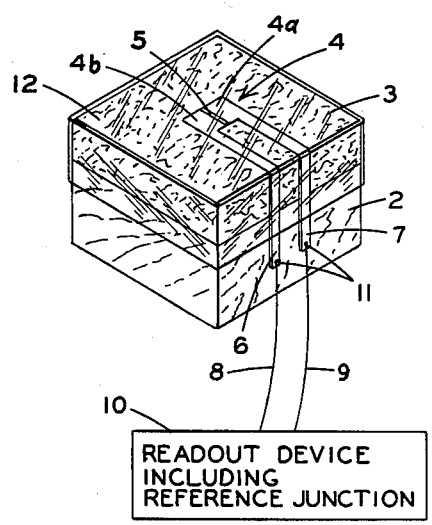
FIG. 3
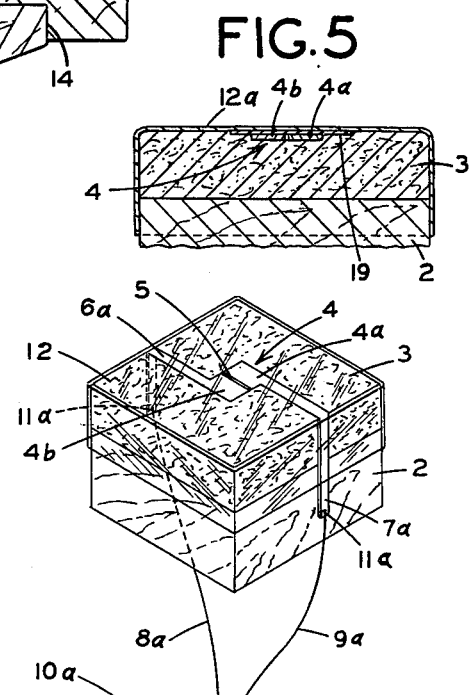
FIG. 4

FAST-RESPONSE THERMOCOUPLE PROBE

BACKGROUND OF THE INVENTION

1. Field of the Invention

This invention relates generally to surface temperature-measuring thermocouple probes, and more specifically to insulated, thin-foil, precision, touch-type, passive probes of this type which have a fast-response time and are capable of producing a result containing only a small and readily correctable measurement error, and to a method for making such a probe.

2. Description of the Prior Art

When various thermocouple probes are placed in contact with a hotter surface for measuring surface temperature, thermal energy transfers from the surface of the probe, resulting in cooling of the portion of the goods contacted, thus leading to a reading lower than the actual goods temperature. Further, whatever the surface temperature at the point of contact, the sensor reads lower because of the combined effect of thermal resistance between the contacted surface and the sensing element of the probe plus heat loss from the sensing element to the remainder of the probe and its environment. Any massiveness of the sensing element and associated components causes delay in response and can cause additional error.

A particular long-standing problem is encountered in the measurement of the surface temperature of lightweight sheets of low thermal-conductivity material moving at high speeds. This is especially so when such sheets are hot enough to be sticky or even partially softened.

U.S. Pat. No. 3,332,285 relates to a fast precision temperature sensing thermocouple probe which deals with the problem of thermal energy transferred to or from a thermocouple probe. The probe structure may be in the form of a hand-held probe with an attached extended handle. This, however, is an active device using an electronic circuit to supply heat to the heating element attached to the thermocouple to bring the probe to a temperature equal to that of the goods, thus minimizing the thermal energy flow from the substance being checked to the probe and increasing the validity of the temperature readings.

U.S. Pat. No. 3,671,328 relates to a temperature measuring thermocouple device wherein, in the most pertinent embodiment of the invention, two strips of different semi-conductor materials are mounted on a nonelectrically conducting substrate material such as glass or ceramic which are intermediate conductors of heat. Output lead wires of similar material are connected to the strips of semi-conductor material and to a suitable electric meter or other instrument. Two other leads dissimilar from each other are connected together at a neutral location on the substrate so that all the connections are at the same constant temperature during a measurement.

Other thin-foil heat sensing devices may be found in the following U.S. Patents issued to N. E. Hager, Jr.: Nos. 3,045,473-July 24, 1972; 3,427,209-Feb. 11, 1969; 3,529,473-Sept. 22, 1970; 3,354,720-Nov. 28, 1967; and 3,217,537-Nov. 16, 1965.

The disclosures of the prior art, however, do not teach how to construct and operate a simple, non-massive, passive, fast-response, touch-type pyrometer capable of measuring temperatures of fixed or moving surface areas, particularly those of lightweight low-thermal-conductivity materials without modifying their temperatures through contact with the probe.

SUMMARY OF THE INVENTION

This invention relates to a fast-response, passive touch-type, insulated thin-foil thermocouple probe for measuring surface temperatures generally and particularly those of a lightweight sheet of a low-thermal-conductivity material moving at a high speed.

It is an object of this invention to provide a fast-response, passive, insulated, thin metal foil thermocouple probe. Another object is to provide such a probe which can be used to measure surface temperatures with only a minimal temperature depressing effect thereon. Another object is to provide such a probe which minimizes error arising from the difference between the temperature of the object and that attained by the thermocouple. Another object is to provide such a probe wherein the portions thereof closest to the object, the temperature of which is to be measured, are not massive, so that the thermocouple can respond rapidly to changes in the objects temperature, and to provide mounting means for the probe which do not detract from this fast response. A still further object is to provide a method for making such a probe.

The probe may include, for example, a block substrate which may be wood or some other lightweight material with a layer of low-density heat insulating material mounted on the upper surface thereof. A thin-foil ribbon thermocouple of two edge-welded dissimilar metals is positioned on the insulating layer. Leads integral with the thermocouple extend therefrom across the insulating layer and down the side(s) of the block. A low-areal-heat-capacity cover film is mounted over and in contact with the upper surface of the insulating layer and the foil ribbon thermocouple and extends at least partially down the sides of the block. A reference junction is also provided. Electrical connections on the foil ribbons connect the foil thermocouple junction to the reference junction, and a readout instrument detects the differential between the electromotive forces developed by the foil and reference junctions. A handle inserted in the wooden block may be mounted on a stand with a ball bearing pivot and counter-weighted to adjust the pressure contact of the probe with the goods, or, the probe may be hand-held.

The method for forming the probe of this invention comprises:

1. Determining approximately the areal heat capacity of the object from which the surface temperature is to be obtained.
2. Providing a mounting substrate adaptable to portable or fixed positioning.
3. Mounting a thermal insulation pad having a thermal conductance varying between 0.1 and 1 Btu/hr-ft$^2$-F.° on the upper face of the mounting substrate. The precise thickness, density, specific heat, and thermal conductivity of the pad being determined by the results of the areal heat capacity determination of 1 above.
4. Applying a thin-metal-foil thermocouple to the free surface of the insulation pad.
5. Applying a cover film to extend over the foil thermocouple and the insulation pad, and partially down the sides of the mounting substrate, the cover film being sufficiently thin such that the combined areal heat capacity of both foil and film is less than about 0.02 Btu/ft$^2$-F.°.

6. Connecting electrical lead wires to leads extending from the thermocouple down the side(s) of the mounting substrate and to a readout device including a reference junction.

The probe of this invention solves many of the problems previously existing in the prior art. By creating mounting means for the thermocouple such that there is no low-thermal resistance heat-flow path from the goods through the probe, goods-temperature depression, in the course of measuring the surface temperature, is minimized even when used on lightweight goods such as paper or plastic films. Also, by keeping the thermal resistance of the cover film much less than that of the insulating layer between the thermocouple and the mounting block, error arising from the difference between the temperature of the goods and that attained by the thermocouple is minimized. Still further, by keeping the areal heat capacity of the cover film and thermocouple low, and by using an insulating layer having a low product of thermal conductivity, density, and specific heat, the massiveness and thermal inertia of the portion of the probe closest to the goods are minimized, so that the thermocouple can respond rapidly to changes in goods temperature.

BRIEF DESCRIPTION OF THE DRAWINGS

FIG. 1 is a side elevational view of the probe of this invention and the mounting means for moving it into and out of contact with the surface of a sheet, the temperature of which is to be measured.

FIG. 2 is an enlarged sectional view of the probe and sheet of FIG. 1.

FIG. 3 is an isometric view of the mounting block of the probe illustrating one way the thermocouple may be mounted thereon.

FIG. 4 is an isometric view of the mounting block of the probe illustrating another way the thermocouple may be mounted thereon, and FIG. 5 is an enlarged sectional view of the top portion of the mounting block of the probe showing a thin metal foil cover film which is electrically insulated from the thermocouple foil by a thin layer of refractory material.

DESCRIPTION OF THE PREFERRED EMBODIMENT

Referring to the drawings, the probe and mounting assembly 1, as shown in FIG. 1, includes a mounting block 2 which is preferably, but not necessarily, of non-electric-conducting material, such as a wooden block or other lightweight material. The block 2 is faced with a layer of thermal insulating material 3. The insulating layer 3 should have a thermal conductance in the range of from about 0.10 to 1.0 Btu/hr-ft$^2$-F.° and may comprise a 0.25 inch layer of low-density fiberglass. Other types of fibrous or cellular insulating materials may be used. For very high temperatures the insulating material 3 can be a refractory material such as Kaowool, manufactured by Babcock and Wilcox Co., Insulating Products Division, Augusta, GA. A thin-foil thermocouple 4 having a thickness varying between 0.0001 and 0.0020 inch is mounted on the layer 3 of insulating material. The thermocouple comprises two dissimilar metal foils 4a and 4b joined by edge-welding corresponding edge portions of their ends together as shown at 5. The thermocouple can be a platelet with dimensions of the order of $\frac{1}{4} \times \frac{1}{4}$ to $\frac{1}{2} \times \frac{1}{2}$ in. Any of the metals suitable for forming thermocouple junctions may be used. Examples of such metal pairs are platinum-rhodium, platinum-rhodium alloys, Chromel-Alumel, Chromel-constantan and Iron-constantan. It is preferred to use copper-constantan, both from the point of view of cost, simplifying fabrication, and also for minimizing parasitic emf effects. Electrical leads 6 and 7 of the thermocouple 4, as best seen in FIGS. 3 and at 6a and 7a in FIG. 4, extend across the surface of the insulating layer 3 and down the side(s) of the mounting block 2 to minimize heat flow. The cross-sectional dimensions of the foil leads 6, 7, 6a, and 7a should be small enough so that heat conducted therealong from the platelet is small compared to that conducted through the thermal insulation layer 3. Electric lead wires 8 and 9 (FIG. 3) and 8a and 9a (FIG. 4) connect the readout device 10 (FIG. 3) and 10a (FIG. 4) to electrical leads 8 and 9 and 8a and 9a respectively by welding as at 11 in FIG. 3 and 11a in FIG. 4. The metal foils 4b (FIGS. 3 and 4) and electrical lead wires 8 and 8a extending therefrom are preferably made of copper. Metal foils 4a and lead wires 9 and 9a are preferably made of constantan. In order that the heat capacity of the heat-sensing element will be kept low, the metal foils 4a and 4b should be kept thin, preferably within the range of about 0.0001-0.0020 inch. Where edge-welding becomes impractical due to the thinness of the foils, or difficulty in rolling them thinner, abutting metallic films may be laid down by chemical means, or evaporated, sputtered, or otherwise deposited onto a non-conducting substrate.

Mounted over and in contact with the foil thermocouple 4 and the insulating layer 3 and extending partially down the sides of the block 2 is a thin, low areal heat capacity cover film 12 of non-electrical-conducting material. This cover film 12 may be a 0.0035-inch film of Teflon. If abrasion is a problem and temperatures are not too high, the film may be of polyurethane, or, it can be polyamides or silicone-glass laminates, a refractory cloth or paper, or as shown in FIG. 5, the cover film may comprise thin metal foil 12a which is electrically insulated from the thermocouple foil 4 by a thin layer of refractory material 19. The areal heat capacity of the cover film should be less than 0.01 Btu/ft$^2$-F.°.

A handle 13 inserted into block 2 at 14 extends downwardly therefrom at an angle is pivotally mounted at 15 on a stand 16 and provided with an adjustable counterweight 17 to control the contact pressure of the probe 1a with the sheet 18. When the probe 1a is mounted on the handle 13 which in turn is mounted on the stand 16, as shown in FIG. 1, the thermocouple lead wires 8 or 8a and 9 or 9a would extend from their points of connection at 11 or 11a to thermocouple leads 6 and 7 or 6a and 7a downwardly along the handle 13 to the pivot point 15 of the stand 16 and be wrapped around the pivot shaft 15a to minimize torque on the probe and thence to a readout device 10 or 10a including a reference junction. In its simplest form the reference junction is a thermocouple cooled with ice water. The thermocouple used is made of the same two alloys as the thermocouple in the probe, and the electromotive force measured is the difference between the electromotive force of a thermocouple in a cool reference state and the same type thermocouple in a heated state in the probe.

Typical of the modern digital readout devices having built-in reference junctions which may be used in this invention is the Model No. 199 Thermocouple Precision Digital Thermometer made by Omega Engineering, Inc., Stamford, CT. These devices have a precision of ±2° F. and a response time of 2 seconds. Other commonly known combination reference junction and readout devices may also be used.

The probe can be used in two distinctly different modes of operation:

First, there is the technique for contacting the surface with relative motion between the probe and the surface, Mode A. This can be done whether the surface is stationary or moving. With stationary goods, relative motion can be obtained by sliding the probe.

Second, there is the technique for touching the probe to the surface in such a manner as to measure the temperature of a fixed area of the surface, Mode B. This can also be done where the surface is moving, provided that the probe can be travelled along with that fixed area for a long enough time interval to complete a reading.

In the course of analyzing these two modes of operation, it has been discovered that the same probe is suitable for both modes. Operating in either mode, the probe can measure surface temperatures of a wide range of common materials, including films and thermal insulating materials, only when the conductance of the thermal insulation pad is less than about 1 Btu/hr-ft$^2$-F.°. There seems to be little practical value in reducing the conductance to less than about 0.1 Btu/hr-ft$^2$-F.°.

MOVING SURFACE-(MODE A)

When the probe $1a$ is placed in contact with goods at temperature T(°F.) and moving at speed S(ft/hr), the approximate error $\Delta T$(°F.) introduced by goods cooling is given by the equation:

$$\Delta T = T - T_{TC} = \frac{ky(T_{TC} - T_o)}{Sd \sum_{i=1}^{n} \delta_i \rho_i c_i} \quad \text{(i)}$$

where $T_{TC}$ is the temperature indicated by the thermocouple in °F., $T_o$ is the ambient temperature in °F., k is the thermal conductivity of the insulating layer in Btu-in./hr-ft$^2$-F.°, d is the thickness of the layer in inches, S is the line speed in ft/hr, and y is the machine-direction dimension of the contacting face of the probe in ft. The quantities $\delta_i$, $\rho_i$, and $c_i$ represent, respectively, the thickness (ft), density (lb/ft$^3$), and specific heat (Btu/lb-F.°) of the $i^{th}$ layer of the goods, the sum being taken over the n layers comprising the goods. The areal heat capacity of an object, the surface temperature of which is to be measured, is defined by the quantity $\Sigma\delta_i\rho_i c_i$, the sum being taken over n layers comprising the goods. It is assumed that the goods is thin but may consist of a base with one or more coatings.

A sample probe was designed for measuring the temperature of plastic-coated paper. A wooden handle was inserted into a $1\times1\times0.5$-in. wooden block; the block was covered with a 0.25-in. layer of low-density (k=0.25 Btu-in./hr-ft$^2$-F.°) fiberglass, and the latter was covered with a 0.0035-in. film of Teflon. The thermocouple foil was cut from 0.0005-in.-thick edge-welded copper constantan ribbon. The running speed S for the paper was 62 ft/min=3720 ft/hr, and other parameters were: $T_{TC}$=300° F., $T_o$=100° F., $\Sigma\delta_i\rho_i c_i$=0.0127 Btu/ft$^2$-F.° and y=1.0 in.=0.0835 ft. Inserting these values into Equation (i) yields the estimate $\Delta T$=0.35 F.°.

The temperature drop $\Delta T_c$ across the cover film (thermal conductivity $k_c$=1.0 Btu-in./hr-ft$^2$-°F. and thickness $d_c$=0.0035 in.) is given by the equation:

$$\Delta T_c = (kd_c/k_c d)(T_{TC} - T_o) = 0.7 \text{ F.°}$$

Therefore, the total estimated error for the measurement is slightly in excess of 1 F.°, an error which is corrected by adding it to the indicated value of $T_{TC}$.

For the instrument to be of greatest practical value the goods should not be cooled during passage across the probe face by more than the usual errors accepted in thermocouple systems and associated readout devices. Typical modern readout devices, as previously stated, such as those made by Omega Engineering Inc; Stamford, CT; have a precision of ±2° F. and a response time of the order of 2 seconds.

What has been discussed in terms of moving goods can also be applied to other moving surfaces such as rolls, or machinery parts. And, as previously mentioned, it can be applied to any situation where there is relative motion between probe and test-surface, even when the latter is stationary and the probe moves.

Also, what has been said for goods warmer than the probe also pertains to the reverse situation when the goods is cooler than the probe. In this case, the objective is to secure readings without the warmer probe elevating and temperature of the cooler goods.

FIXED AREA OF SURFACE-(MODE B)

In places where friction is a matter of concern, or where the extent of the surface is too small to slide the probe, or where a reading is desired at a specific location on the goods it is more suitable to hold the probe in fixed contact with the goods at a series of nearby locations; when successive readings reach a fixed level, the reading is recorded. The performance criterion is that the probe should not cool the final location of contact by an amount exceeding the system measurement error before the system has time to respond completely to the final reading. That is, the probe should not cool the test surface by more than about 2° F. within about two seconds after final contact is established.

DEFINITION OF PARAMETERS FOR PROBE TO BE USED WHEN THERE IS RELATIVE MOTION BETWEEN PROBE AND CONTACTED GOODS-(MODE A)

A. Avoidance of Excessive Cooling of Goods

As previously stated herein, when contacting lightweight goods of areal heat capactity $\Sigma\delta_i\rho_i c_i$ running at speed S, the approximate temperature-depression error $\Delta T$ introduced by goods-cooling is given by $$\Delta T = \frac{ky(T_{TC} - T_o)}{Sd \Sigma \delta_i \rho_i c_i} \quad \text{(i)}$$

where the symbols are previously defined herein.

It is desirable that $\Delta T$ be kept so low that it is unnoticed in view of the normal precision of thermocouple materials. Precision thermocouple wire, such as copper-construction manufactured by Thermoelectric Company of Saddle Brook, N.J., normally has a precision of about $\pm\frac{3}{4}\%$ in the region from 200° F. to 700° F. Therefore, $\Delta T$ can be as large as about 0.01 ($T_{TC}-T_o$) before the goods-cooling error becomes a limiting factor. If it is required that $\Delta T<0.01(T_{TC}-T_o)$, then $\Delta T/(T_{TC}-T_o)<0.01$.

and from Equation (i), one obtains $$ky/Sd\Sigma\delta_i\rho_i c_i < 0.01$$

Solving leads to the design requirement that $$ky/d < 0.01 S \Sigma \delta_i \rho_i c_i \tag{ii}$$

If $T_{TC}=200°$ F. and $T_o=70°$ F., then $\Delta T=0.0075\times200=1.5°$ F., and $T/(T_{TC}-T_o)=1.5/(200-70)=0.0115$. Similarly, if $T_{TC}=700°$ F., $\Delta T/(T_{TC}-T_o)=5.25/(700-70)=0.008$. Therefore, throughout the temperature range, it is approximately true that $\Delta T=0.010\ (T_{TC}-T_o)$.

A probe was built for use in producing goods having areal heat capacity $\Sigma\delta_i\rho_ic_i=0.0127$ Btu/ft²-F.° at speed $S=3720$ ft/hr. Therefore, according to Equation (ii), it was necessary to keep $ky/d$ less than 0.47 Btu/hr-ft-F.°. It was found possible to meet this condition by using an insulating slab having $k=0.25$ Btu-in./hr-ft²-F.° and $d=0.25$ in. and $y=0.0835$ ft. This resulted in $ky/d$ equalling 0.0835 Btu/hr-ft-F.°, a result which meets the requirement of being less than 0.47 Btu/hr-ft-F.°.

B. Minimizing of Temperature Difference Between Goods and Thermocouple

When the goods are hotter than the probe, some heat must flow to the latter during contact. When heat flows through the cover film, there must be a temperature difference across that film and consequently, the thermocouple must read cooler than the goods. The resulting error $\Delta T_C$ is given by the equation $$\Delta T_c = (kd_c/k_c d)(T_{TC} - T_o) \tag{iii}$$

as before, it is preferred to keep this error too small to be measurable with the thermocouple materials employed, and, therefore, it is required that $$\Delta T_C/(T_{TC}-T_o) < 0.01,$$

which, in view of Equation (iii), means that the design must conform to the condition $$(k/k_c) \times (d_c/d) < 0.01. \tag{iv}$$

The probe built here employed a cover film having $k_c=1.0$ Btu-in./hr-ft²-F.° and $d_c=0.0035$ in.; using $k$ and $d$ values given above, one obtains $$(k/k_c) \times (d_c/d) = (0.25/1) \times (0.0035/0.25) = 0.0035.$$

This is less than 0.01, and, therefore meets the criterion stated in Equation (iv).

C. To Obtain Fast Response to Temperature Change

To enable the thermocouple to settle down to a new value of $T_C$ as rapidly as possible, theory shows that it is necessary that (1) the sum of the areal heat capacities of the cover film and thermocouple foils be low, and (2) the transient heat flow into the insulating layer be low, i.e., so the mounting means does not detract from the advantage gained from (1). Stated mathematically, as taught in "Heat Conduction In Solids," 1974 Edition, by Carslaw and Jaeger, it is required that $\delta_c\rho_c c_c + \delta_{TP}\rho_{TC}T$ be kept small and that $k\rho c$ be kept small.

In the probe tested here, with a 0.0035-in. Teflon cover and 0.0005-in. foil thermocouple, $\delta_c\rho_c c_c + \delta_{TP}\rho_{TC}T \approx 0.011$ Btu/ft²-F.°, and $k\rho c \approx 0.017$ Btu²/hr-ft⁴-°F.².

Tests show that this probe completes ⅔ of full response within 0.2 sec and responds completely within 2 sec. With goods running at 3720 ft/hr=1.03 ft/sec, the probe is fast enough to pick up off-temperature conditions within the time interval during which 0.2 ft of goods is run.

DESIGN REQUIREMENT FOR PROBE CONTACTING FIXED AREA OF SHEET GOODS
(MODE B)

Assume the probe has been jumped or slid around a warm sheet of goods at temperature T until the contact face of the probe has been brought up to a temperature very near that of the sheet. Finally it is brought into fixed contact with a fresh area of the warm sheet, an area which has not yet been contacted by the probe. At worst, the probe base-block is still at its initial ambient temperature $T_o$, and the maximum initial heat flux $F_o$ from the sheet into the probe is given by the equation $$F_o = (k/d)(T-T_o), \tag{1}$$

where $k$ and $d$ are, respectively, the thermal conductivity and thickness of the insulating pad on the probe. Assuming the sheet is thin enough to be nearly isothermal, the loss of heat to the probe will initially change its temperature at a rate $\Delta T/\Delta t$ given by the equation $$F_o = (\Sigma\delta_i\rho_ic_i)\Delta T/\Delta t \tag{2}$$

where $\delta_i$, $\rho_i$ and $c_i$ are, respectively, the thickness, density and specific heat of the $i^{th}$ layer of the goods and the sum is taken over all layers.

Combining Eqs. (1) and (2), and solving gives the result $$\frac{k}{d} = \left(\frac{\Delta T}{T-T_o}\right)\left(\frac{\Sigma\delta_i\rho_ic_i}{\Delta t}\right) \tag{3}$$

If it is required that the sheet temperature change not exceed 1% of the goods temperature elevation $T-T_o$, then $\Delta T/(T-T_o)$ is required to be less than 0.01. Therefore, the probe must be designed such that $$k/d < (0.01\Sigma\delta_i\rho_ic_i)/\Delta t \tag{4}$$

Finally, if completing the reading requires at least 2 seconds=2/3600 hr, the requirement is written $$k/d < 18\Sigma\delta_i\rho_ic_i \tag{5}$$

DESIGN REQUIREMENT FOR PROBE CONTACTING FIXED AREA OF THICK MATERIAL-(MODE B)

Assume that the probe has been brought up to temperature by a series of contacts with a thick layer of material, and is then brought into fixed contact with a fresh area not yet affected by contact with the probe.

As before, there will be a flow of heat into the probe given by $$F_o = (k/d)(T-T_o) \tag{1}$$

Because heat is drawn from the contacted material at this rate, the surface temperature of the material will fall. At the end of time interval $\Delta t$, the surface-temperature decrease $\Delta T$ is given by Carslaw and Jaeger ("Heat Conduction in Solids," 1947 Edition, P. 56) in the form of the equation $$\Delta T = 2(F_o/k')(k'\Delta t/\pi \rho' c')^{\frac{1}{2}} \quad (6)$$

where $k'$, $\rho'$, and $c'$ are, respectively, the thermal conductivity, density, and specific heat of the contacted material. Combining Eqs. (1) and (6) and solving gives $$\frac{k}{d} = \frac{1}{2}\left(\frac{\Delta T}{T-T_o}\right)\left(\frac{\pi k' \rho' c'}{\Delta t}\right)^{\frac{1}{2}} \quad (7)$$

If now we require that $\Delta T(T-T_o)$ not exceed the nominal thermocouple measurement error of about 0.01, and if it takes at least 2 sec to complete the temperature measurement after contact begins ($\Delta t > 2/3600$ hr), Eq. (7) reduces to the equation $$k/d < 0.376(k'\rho' c')^{\frac{1}{2}} \quad (8)$$

COMBINED REQUIREMENT FOR PROBE CONTACTING FIXED AREA OF ANY MATERIAL

In measuring many categories of materials by the fixed-contact-area technique, including most types of films thinner than about 20 mils, and low-thermal-conductivity solids, for broadest usefulness, it is required that the probe insulation pad be designed with $k/d < 1$ Btu/hr-ft$^2$-F.°.

On the other hand, except for uncommonly thin films or low-density foams, it appears that there is little to gain by requiring $k/d$ to be much lower than about 0.1 Btu/hr-ft$^2$-F.°. Because of limitations on k-values for practical materials, a lower value of $k/d$ can be attained only by using a very thick layer of insulation, this makes the probe too bulky and insufficiently rugged for general use. Therefore, for use with the fixed-contact-area mode of operation, (MODE B) the requirement for the probe is $0.1 < k/d < 1.0$.

What is claimed is:

1. A passive fast-response insulated-foil thermocouple probe comprising
    (a) a mounting block movable with a handle;
    (b) a layer of insulating material having a low product of thermal conductivity, density, and specific heat mounted on the upper surface of said mounting block;
    (c) a thin-foil ribbon thermocouple comprising two dissimilar metal foils joined in a junction at corresponding ends thereof and positioned on the upper surface of said layer of insulating material;
    (d) a low-areal-heat-capacity cover film mounted over the upper surface of the insulating layer and the foil ribbon thermocouple thereon and extending at least partially down at least one of the sidees of the mounting block;
    (e) electrical connections on each of said two dissimilar metal foil ribbons of the thermocouple at their extremities adapted to electrically connect in series, said thermocouple, a reference junction, and means for sensing electromotive force developed in a circuit, whereby said sensing means responds to the differential between the electromotive force produced by the foil and reference junctions; and
    (f) said probe movable against an object with a preselected amount of force for measuring the temperature of an object without modifying its surface temperature.

2. The thermocouple probe according to claim 1 including mounting means therefor for moving the probe into and out of contact with the surface of an object the temperature of which is to be determined.

3. The thermocouple probe according to claim 1 wherein the thermal conductance of the insulating layer is in the range of from about 0.10 to 1.0 Btu/hr-ft$^2$-F.°, and the product of thermal conductivity, density, and specific heat is in the range of from about 0.001 and 0.050 Btu$^2$/hr-ft$^4$-°F.$^2$.

4. The thermocouple probe according to claim 1 wherein the insulating layer comprises a 0.25 inch layer of fiberglass having a density in the range of from about 1 to 5 lbs/ft$^3$.

5. The thermocouple probe according to claim 1 wherein the thin-foil thermocouple has a thickness in the range of from about 0.0001 to 0.0020 inch.

6. The thermocouple probe according to claim 5 wherein the thin foil thermocouple comprises a 0.0005 inch thick edge-welded copper-constantan foil ribbon.

7. The thermocouple probe according to claim 5 wherein the cover film comprises a 0.0035 inch film of polytetrafluoroethylene.

8. The thermocouple probe according to claim 5 wherein the cover film comprises a thin film of polyurethane.

9. The thermocouple probe according to claim 1 wherein the cover film is a plastic material.

10. The thermocouple probe according to claim 1 wherein the cover film has a thickness in the range of about 0.5 to 5 mils and a thermal conductivity in the range of about 0.1 to 2 Btu-in./hr-ft$^2$-F.°.

11. The thermocouple probe according to claim 1 wherein the cover film comprises a thin metal metallic foil, electrically insulated from the thermocouple foil by a thin layer of refractory material.

* * * * *